(12) United States Patent
Alvis

(10) Patent No.: US 6,293,698 B1
(45) Date of Patent: Sep. 25, 2001

(54) METHOD FOR PRECISE TEMPERATURE SENSING AND CONTROL OF SEMICONDUCTOR STRUCTURES

(75) Inventor: Roger L. Alvis, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 906 days.

(21) Appl. No.: 08/539,092

(22) Filed: Oct. 4, 1995

(51) Int. Cl.$^7$ ...................................................... G01K 7/00
(52) U.S. Cl. ............................ 374/164; 374/163; 324/719
(58) Field of Search .................... 374/163, 164; 324/719

(56) References Cited

U.S. PATENT DOCUMENTS

| | | | |
|---|---|---|---|
| 5,260,668 | * 11/1993 | Mallory et al. | 324/719 |
| 5,291,142 | * 3/1994 | Ohmi | 324/719 |
| 5,497,076 | * 3/1996 | Kuo et al. | 324/719 X |
| 5,532,600 | * 7/1996 | Hoshino | 324/719 X |

* cited by examiner

*Primary Examiner*—Benjamin R. Fuller
*Assistant Examiner*—Paul Amrozowicz
(74) *Attorney, Agent, or Firm*—H. Donald Nelson

(57) ABSTRACT

Precise sensing and controlling of temperature during in-situ testing of a structure used in an integrated circuit by fabricating or placing a heat source element adjacent to the structure and by fabricating or placing a temperature sensing element adjacent to the structure.

7 Claims, 6 Drawing Sheets

METHOD FOR PRECISE TEMPERATURE SENSING AND CONTROL OF SEMICONDUCTOR STRUCTURES

BACKGROUND OF THE INVENTION

1. Field of the Invention

This invention relates generally to semiconductor wafer manufacturing, and, more particularly, to a method of precisely sensing and controlling temperature of a structure used in an integrated circuit during testing.

2. Discussion of the Related Art

The rapid growth of technological requirements and the worldwide acceptance of sophisticated electronic devices have created an unprecedented demand for large-scale, complex, integrated circuits. Meeting these demands has required technological advances in materials and processing equipment and a significant increase in the number of individuals involved in integrated circuit design and testing. In addition, there has been an increased emphasis on effectively utilizing sophisticated test instruments to aid in the analysis of the manufacturing parameters so that the design and manufacturing process can be improved in order to increase the performance of the final semiconductor product.

In order to meet the increasing demand, there has been an ever increasing requirement to increase the density of devices manufacturable on a semiconductor substrate. The number of devices manufactured on a chip exceeded the generally accepted definition of VLSI (very large scale integration) of more than 100,000 devices per chip in the mid-1970s. By 1986, this number had grown to over 1 million devices per chip. As is well known, today the number of devices per chip is well over 1 million devices per chip and is growing rapidly. Generally, the increase in the number of devices per chip has been achieved by reducing the minimum feature size, enlarging the chip area, and improving the packing efficiency of the devices. The main questions facing chip designers concern how long the growth in devices per chip can continue, how can the performance potential of the ULSI (ultra large scale integrated) circuits be best utilized, and most importantly, what will be the factors limiting the future growth. Currently, interconnection- and packaging-related issues are among the main factors that determine the maximum number of circuits that can be integrated on a chip as well as the chip performance. Interconnections and packaging will gain even more importance as feature sizes of transistors are reduced and chip dimensions are enlarged. Therefore, understanding the on-chip and chip-to-chip interconnection issues will be one of the keys to achieving the full potential of future ULSI systems.

Conceptually, digital integrated circuits contain two basic components: transistors and interconnections. At low integration levels (SSI and MSI), circuit speed, packing density, and yield are determined by transistors, but as more and more devices are integrated on a single die, interconnections gain importance. Interconnections play an important role in determining the speed, area, reliability, and yield of VLSI circuits.

Aluminum is the preferred metal for VLSI interconnections because of its low resistivity, good adherence to silicon and silicon dioxide layers, bondability, patternability, and ease of deposition. In addition, aluminum can be easily purified and it is a readily available and low-cost material. In spite of its positive qualities, aluminum interconnections introduce many reliability problems such as electromigration and contact failures.

Electromigration is one of the major interconnection failure mechanisms in VLSI integrated circuits. It is caused by the transport of the metal atoms when they get bombarded with electrons. As they collide with the oncoming electrons, the metal atoms migrate, primarily via grain boundary diffusion, generating electrical opens and shorts that cause the circuit to fail.

Because of the importance of interconnections to the VLSI process as well as the ULSI process it is becoming critical that methods are available to study the various factors affecting reliability of integrated circuits. Temperature is a major factor in many phenomena associated with semiconductors and integrated circuits and it is critical that methods are available to study the effects of temperature on these phenomena. For example, electromigration-induced mass transport phenomena increase linearly with current density and exponentially with temperature. Therefore, because electromigration is a key factor causing failure in semiconductor integrated circuits it is important to be able to characterize precisely the mode of failure and determine a MTTF (mean time to failure) of a device. Because of the criticality of the determination, it is also necessary that the testing be done on an accelerated basis and in some instances be done in-situ. In addition, the expected lifetime of the technology also requires that accelerated lifetime tests be done.

Using the phenomena of electromigration as an example of a phenomena that needs to be characterized by the methods of the present invention, the present method of accelerated testing of the effects of electromigration is to place a sample representative of the structure to be characterized in a test structure. Current is caused to flow through the sample while the temperature of the test structure is raised to cause failure on an accelerated basis. However, a major problem with this method of testing is that as can be appreciated by one skilled in the art, one of the effects of electromigration is that when metal atoms are dislocated a void is formed causing the effective cross section to decrease. Because the current density will increase in the remaining portion of the interconnect the temperature will rise causing a "hot spot" in the interconnect. In addition, as temperature increases the resistance increases, an increase in resistance causes the temperature to increase causing an upward spiral of temperature-resistance-temperature increases until rapid failure. If this rise in temperature/resistance/temperature, etc., is not detected and accounted for the test results will be inaccurate. Another aspect of failure that must be accounted for is that other alloying elements such as copper and silicon may be affected by the increase in temperature and cause failure. This affect must also be accounted for or convoluted test results may be obtained.

It is also important that a method be available to test in-situ various semiconductor devices. In this case, it would be desirable to be able to fabricate either a heat source or a temperature sensor or both adjacent to the device to be tested during the actual fabrication of the device. In this way, test results and reliability behavior may be more accurately extrapolated to the actual conditions that the device will be subjected to during its intended lifetime.

Accordingly, what is needed for precise reliability testing and in-situ dynamic materials characterization experiments is to have a method for local temperature control and sensing at the wafer level as well as at a test structure level.

SUMMARY OF THE INVENTION

A method for precise sensing and controlling of the temperature during testing of a semiconductor structure by placing a heat source adjacent to the semiconductor structure and heating the semiconductor structure to a predetermined temperature.

In one embodiment of the invention a thin strip of the semiconductor structure to be tested and a heat source is encapsulated in a dielectric material within a test structure and the heat source raises the semiconductor structure to a predetermined temperature. A temperature sensor can also be encapsulated with the semiconductor structure to be tested so that precise control of the temperature can be attained.

In other embodiments of the invention multiple heat sources and multiple temperature sensors can be utilized in test structures. In addition, the heat sources and temperature sensors can be juxtaposed along the entire length of the semiconductor structure being tested or can be juxtaposed for only a portion of the length of the semiconductor structure being tested.

An alternative embodiment is to fabricate a heat source or a temperature sensor or both adjacent to a semiconductor structure to be tested on a die during manufacture of the die. This allows the semiconductor structure to be tested in-situ.

The present invention is better understood upon consideration of the detailed description below, in conjunction with the accompanying drawings. As will become readily apparent to those skilled in this art from the following description there is shown and described preferred embodiments of this invention simply by way of illustration of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION OF THE PREFERRED EMBODIMENTS

Figure 1:
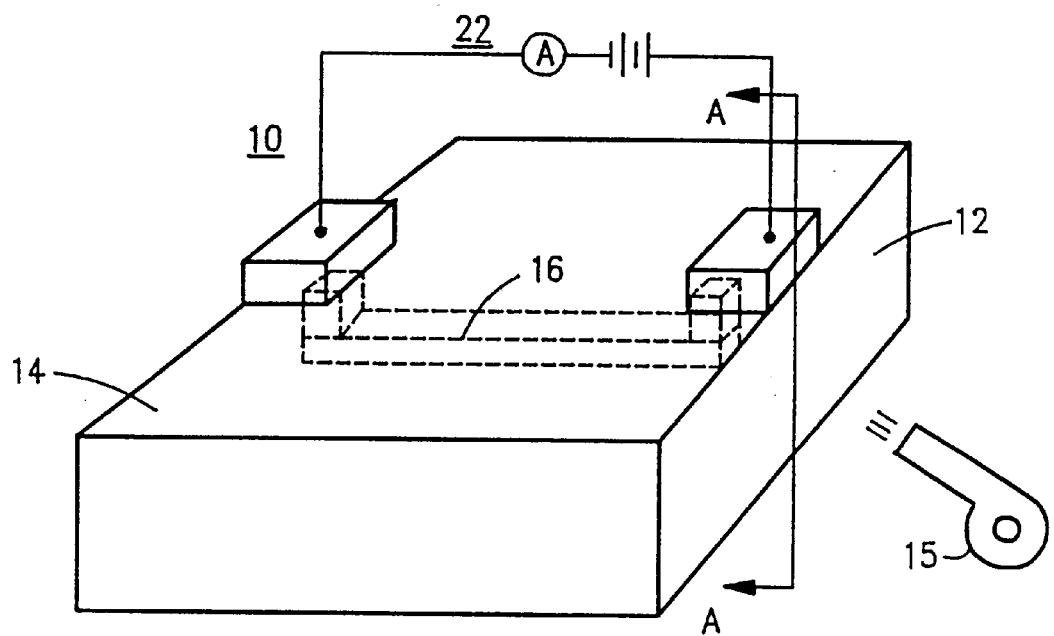
FIG. 1 depicts a prior art test structure used to measure electromigration.
Figure 2:
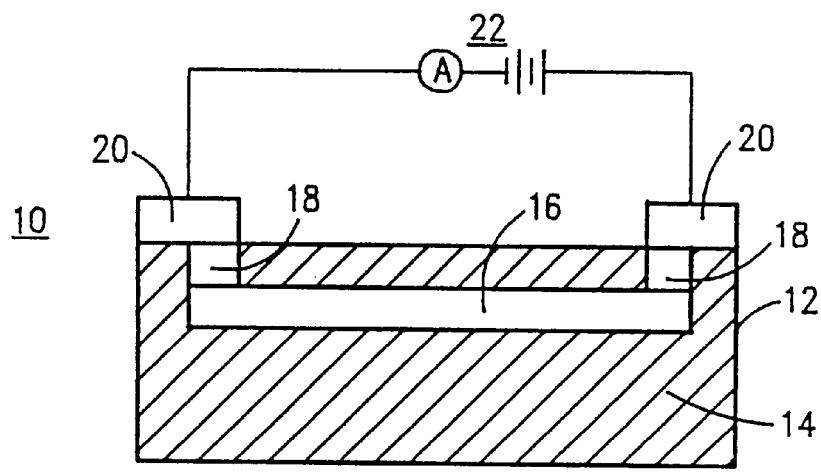
FIG. 2 is a cross-section of the test structure shown in FIG. 1.

Referring now to FIG. 1, there is depicted a test structure 10 that is utilized in the prior art to measure electromigration. FIG. 2 is a cross-section taken through the test structure 10 at Section AA. The test structure 10 consists of a container 12 filled with a material 14 similar to that used in the semiconductor industry to encapsulate integrated circuits. A structure 16 is suspended in the material 14 by via connections 18 which in turn are connected to bonding pads 20. The bonding pads allow connection to test circuits such as that represented at 22 which supply an electrical parameter to the structure 16 during testing. An external heating element 15 is shown which is used to heat the entire test structure 10.

Figure 3:
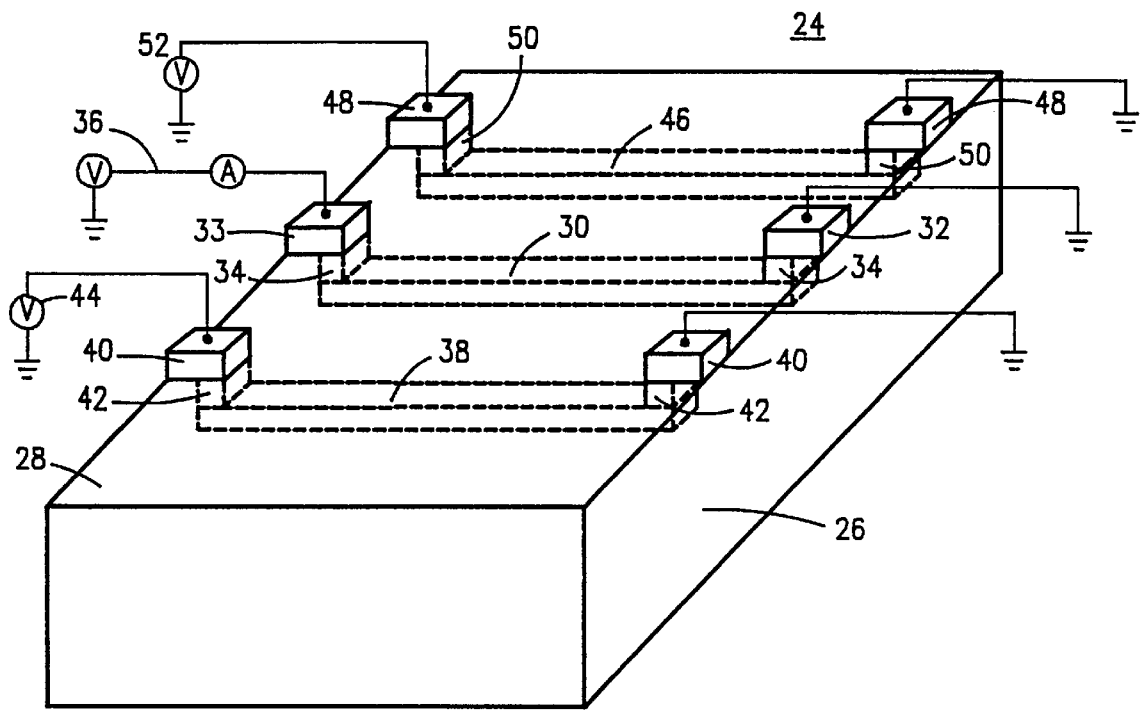
FIG. 3 depicts an embodiment of a test structure of the present invention.

FIG. 3 depicts a test structure 24 of the present invention and is similar to the test structure 10 (FIGS. 1 and 2) discussed above relative to testing for electromigration. It should be understood that the discussion relating to testing for electromigration is for illustrative purposes only and that other tests are comprehended by the present invention. Test structure 24 consists of a container 26 filled with an encapsulating material 28. Suspended in container 26 is a structure 30 to be tested. The structure 30 is connected to bonding pads 32 by vias 34. The bonding pads 32, which may be another metal, allow connection to an electrical test circuit represented at 36 which supply an independent electrical variable to the structure 30 during test. Also the structure under test may have integral and or coplanar bond pads which are connected to test circuit 36. The electrical test circuit 36 allows for a measurement of a dependent variable such as current. For example, the independent variable could represent voltage and the dependent variable could represent current and by keeping voltage constant a change in current with time could indicate a change in resistance as is typically the case during electromigration. Alternately, the independent variable could be current and the dependent variable could be the voltage required to maintain the current. Also shown in FIG. 3 is a thermal element 38 suspended in the test structure 26 adjacent to the structure 30 under test. In this case thermal element 38 is juxtaposed along the entire length of structure 30. It should be comprehended that thermal element 38 could be juxtaposed along a length other than the entire length of structure 30. Thermal element 38 is connected to bonding pads 40 by vias 42 which allow connection to an electrical or measurement circuit represented at 44. Material selection for thermal element 38 and other thermal elements introduced below is based on the criteria that no interaction between the material and surrounding media, such as the material 28 should be possible at operating and test temperatures and that no phase changes are thermodynamically allowed in any of the thermal elements. Tungsten, for example, can be used as a thermal element because of its relatively high resistivity, high melting temperature, and high purity from a CVD deposition source. Other materials meeting the same criteria can also be used. Referring again to FIG. 4, a second thermal element 46 is shown suspended in the test structure 26. Thermal element 46 may be connected to bonding pads 48 by vias 50 which allow connection to an electrical or measuring circuit 52.

Thermal elements 38,46 can be connected to electrical circuits or measurement circuits to act in one of several ways including, but not limited to, as a heat source or as a temperature sensor. As discussed above, tungsten meets the material interaction criteria. Therefore, if the thermal element is connected to a voltage source, the thermal element will act as a heat source because of its resistivity. Similarly, because the resistivity of tungsten varies in a known way with temperature, if an ohmmeter is connected to a thermal element, the measured resistance will be an indication of the temperature of the thermal element. It should be appreciated, therefore, that any of the thermal elements discussed herein and shown in any of the figures can be connected to external circuits to act as either a heat source or as a temperature sensor.

Figure 4:
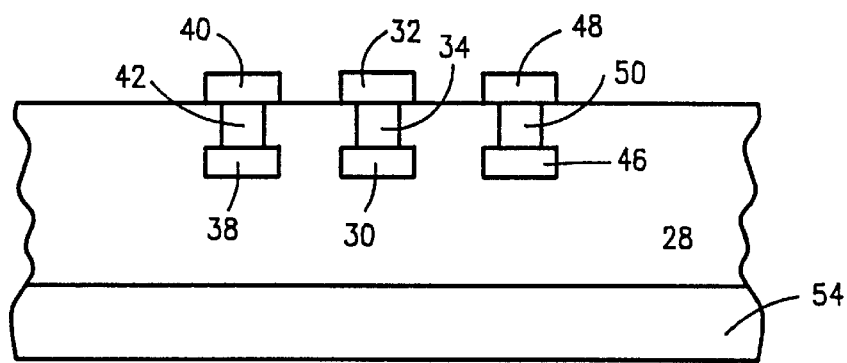
FIG. 4 is a cross-section of the embodiment shown in FIG. 3.

FIG. 4 is a partial side view of FIG. 3. Also represented in FIG. 4 is the concept that thermal elements 38 and 46 could be fabricated on a wafer during fabrication of the wafer. This is represented by showing a wafer substrate 54.

Figure 4A:
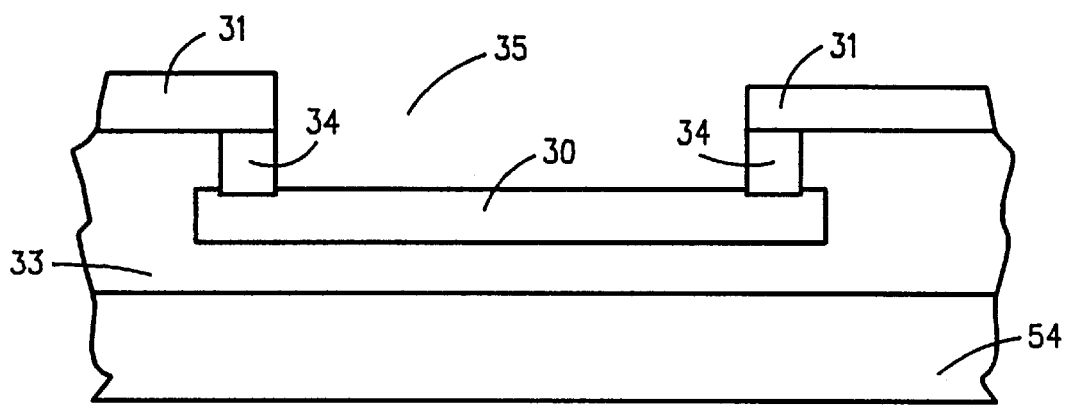
FIG. 4A depicts an alternate embodiment of the structure shown in FIG. 4.

FIG. 4A depicts an alternate method of suspending structure 30 in a test structure. Vias 34 connect structure 30 to a second metal 31 which in turn are connected to an electrical circuit (not shown). There can be a first dielectric layer 33 disposed between substrate 54 and structure 30 and metal structures 31. There can be a second dielectric layer 35 disposed over structure 30. The first dielectric layer 33 can be the same material as the second dielectric layer 35.

Figure 4B:
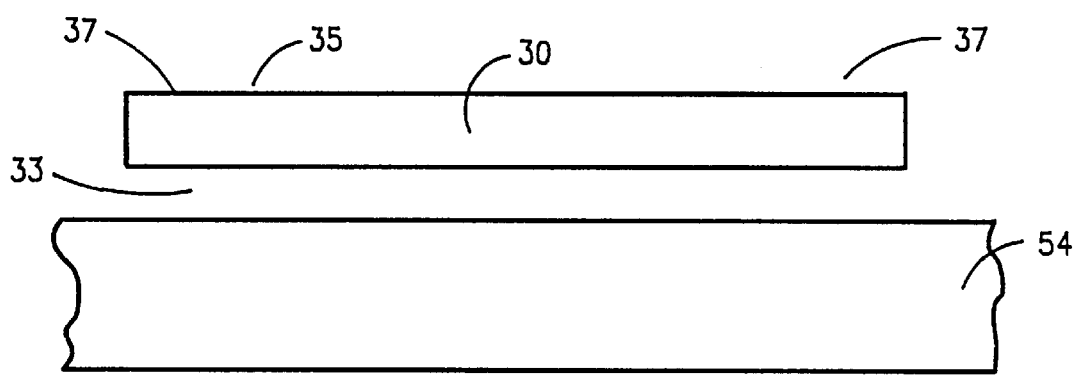
FIG. 4B depicts another alternate embodiment of the structure shown in FIG. 4.

FIG. 4B depicts a structure 30 with integral coplanar bonding pad areas represented by 37 at each end of structure 30. There can be a first dielectric layer 33 disposed between substrate 54 and there can be a second dielectric layer 35 disposed above structure 30.

Figure 5:
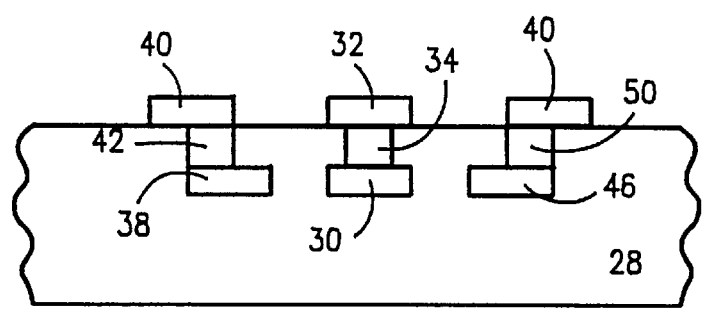
FIG. 5 is an alternative to the embodiment shown in FIG. 4.

FIG. 5 is an alternative method of suspending thermal elements 38 and 46 so they are physically closer to structure 30. It is not intended for thermal elements 38 and 46 to contact structure 30 at any point, however, under other circumstances and with use of other materials it may be comprehended that a thermal element and semiconductor structure under test may be in contact.

Figure 6:
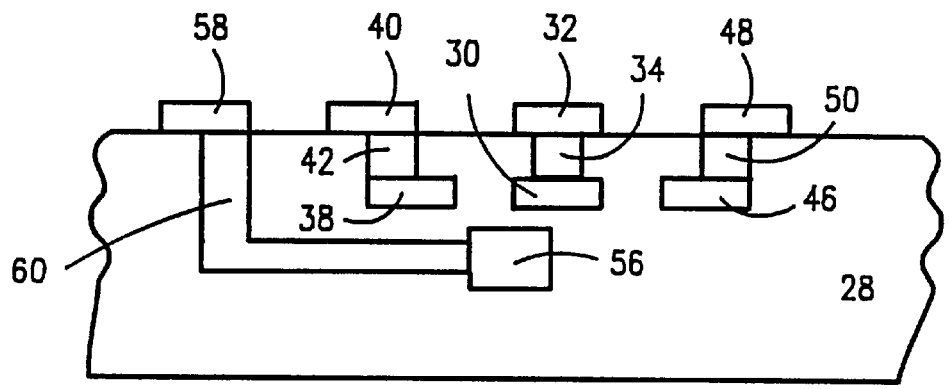
FIG. 6 is still another alternative to the embodiment shown in FIG. 4.

FIG. 6 is another alternative method to that shown in FIG. 5. FIG. 6 shows an additional thermal element 56 suspended in material 28 and connected to bonding pad 58 by via 60. The additional structure 56 could be connected as an additional heat source or a temperature sensor.

Figure 7:
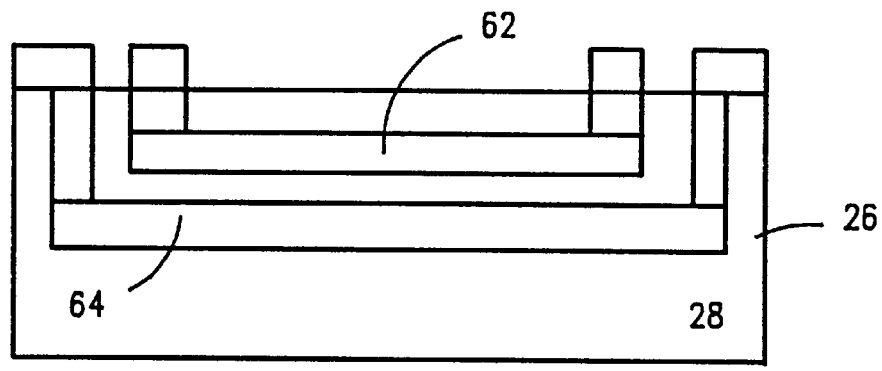
FIG. 7 is also another alternative to the embodiment shown in FIG. 4.

FIG. 7 is another method of suspending test structures or thermal elements in a test structure. FIG. 7 represents a front view of the test structure 26 and shows a first structure 62 suspended in the test structure 26 and a second structure 64 suspended in the test structure 26. Either structure 62 or 64 could be a structure under test or a thermal element. The structure could also be used as a temperature measuring device for high temperature TEM (transmission electron microscopy) in-situ dynamic measurements. For example, structure 62 could be a first alloy metal in contact with a second metal and structure 64 could be a heat source to raise the temperature of structure 62 while dynamic measurements are taken. An example of the metals tested could be an AlCu alloy in contact with a titanium structure and the dynamic TEM would allow a determination of the test effects on the contact between the two metals.

Figure 8:
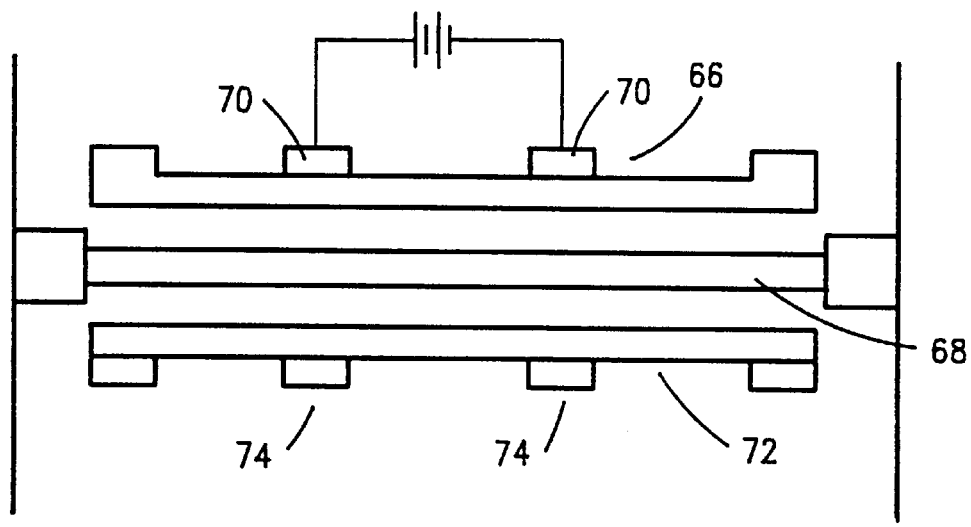
FIG. 8 is another embodiment of the present invention.

FIG. 8 depicts another embodiment of the present invention and shows a thermal element 66 adjacent to a structure under test 68. If thermal element 66 is connected as a heat source the bonding pads 70 are connected to thermal element 66 in such a way as to allow only a selected portion of structure 68 to be heated. Similarly, there is shown a thermal element 72 with bonding pads located at intermediate locations. Structure 72 could be connected as an additional heat source or it could connected as a temperature sensor to measure the temperature of structure 68 between the area represented by bonding pads 74.

Figure 9:
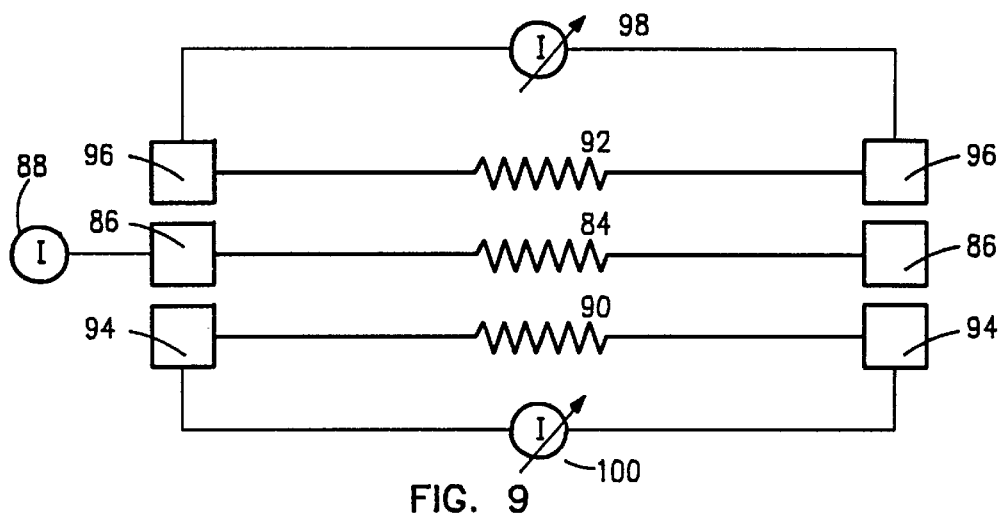
FIG. 9 is a schematic representation of a configuration of the present invention showing active heating elements.

Referring now to FIG. 9 there is shown a schematic diagram of the testing device depicted in FIG. 3. The semiconductor structure under test is represented by a resistance 84 connected to bonding pads 86 which is supplied with a constant current source represented at 88. There are shown two thermal elements 90 and 92 represented as resistances. Thermal element 90 is shown with bonding pads and thermal element 92 is shown with bonding pads 96. Thermal element 92 is connected as a heat source indicated by being connected to a source of variable current 98. Thermal element 90 is also shown connected as a heat source by being connected to a source of variable current 100. This connection represents a simple, uncalibrated method of delivering heat to the structure under test.

Figure 10:
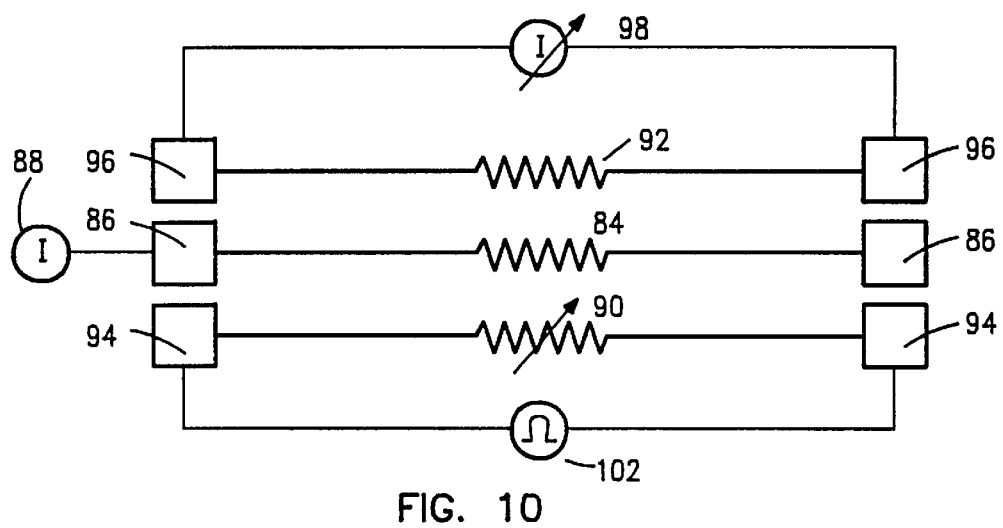
FIG. 10 is a schematic representation of an alternate configuration of the present invention with an active heating element and a temperature sensor.

FIG. 10 represents another configuration similar to the one shown in FIG. 9 (the same numerical labels are used for like elements in FIGS. 10–12 as shown in FIG. 9) with the only difference being that thermal element 90 is connected to be a temperature sensor by being connected to an ohmmeter 102. Thermal element 90 is shown as being a variable resistance, indicating that the resistance is a function of temperature and therefore temperature can be obtained by measuring the resistance. In this mode the test structure is operated in a "passive" thermometer mode. This mode allows the geometrical effects to be eliminated by monitoring the ratio of measured resistances and by knowing both the initial temperature and temperature dependence of a material's resistivity, the local temperature, i.e., the temperature of the structure can be easily determined.

Figure 11:
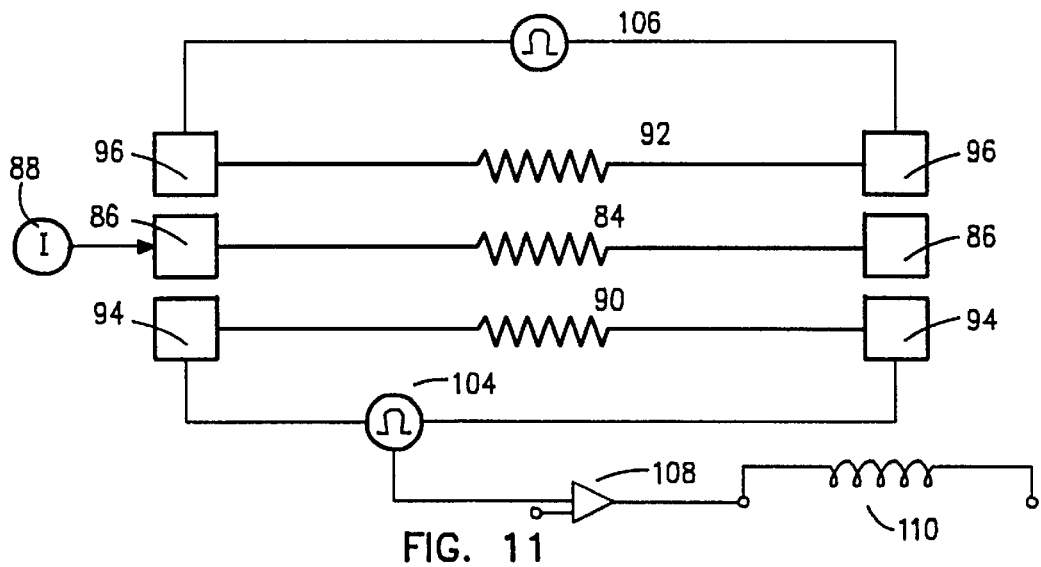
FIG. 11 is a schematic representation of a configuration of the present invention with feedback from a temperature sensor controlling an external heat source.

FIG. 11 depicts a configuration wherein there are no internal heat sources and the thermal elements 90 and 92 are connected as passive temperature sensors by being connected to ohmmeters 104 and 106 respectively. The output of ohmmeter 104 is shown connected to opamp 108 which controls heating element 110 which heats the test structure (not shown) or wafer (not shown) that contains the structure being tested.

Figure 12:
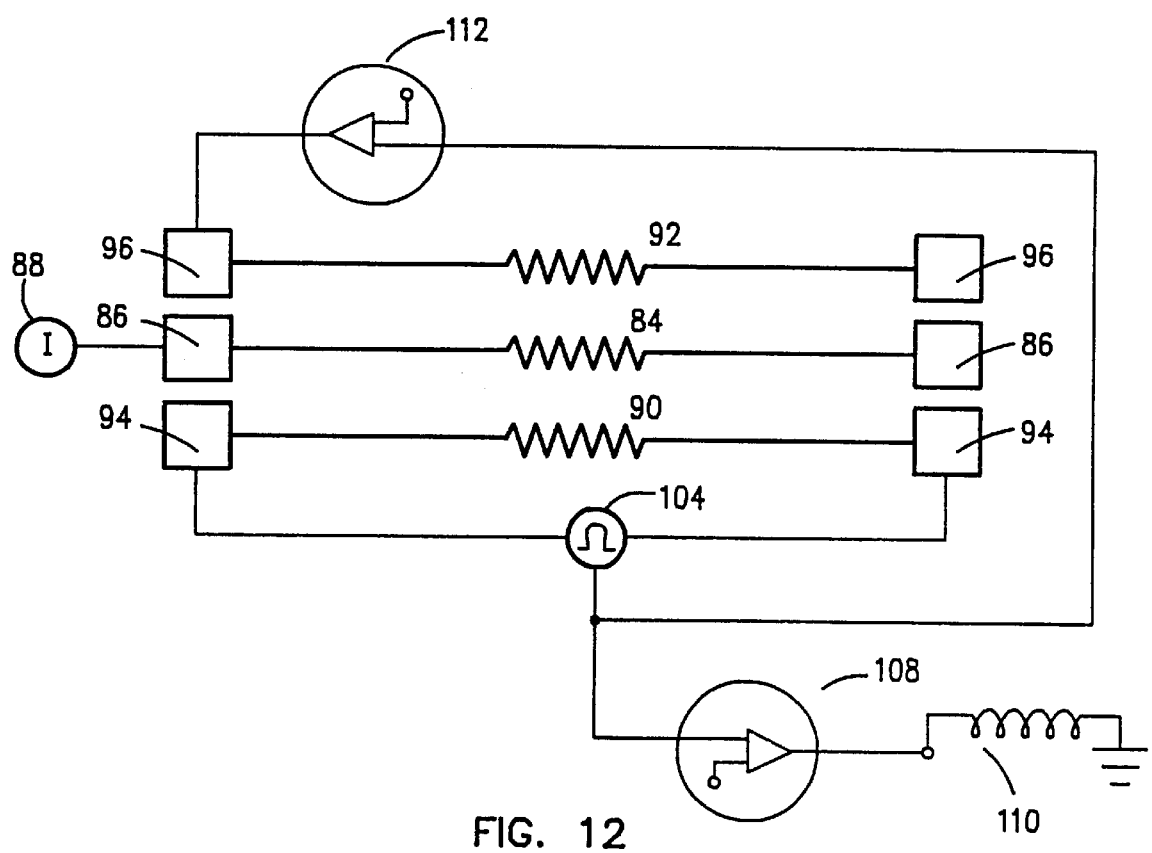
FIG. 12 is a schematic representation of a configuration of the present invention with feedback from a temperature sensor controlling an external and an internal heat source.

FIG. 12 depicts a configuration similar to that shown in FIG. 11 except that the output of ohmmeter 104 is input to opamp 112 which controls the current through thermal element 92 as well as controlling the heat output of heating element 110. It should be appreciated that either of the heat sources, that is, external heat source 110 or internal heat source 92 in this configuration could be deleted or added to and still be within the scope of this invention.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim is:

1. A method for precisely sensing and controlling the temperature during testing of a structure used in an integrated circuit, comprising the steps of:

provided a structure to be tested;

placing at least one thermal element adjacent to a first portion of said structure to be tested;

placing at least one sensing element adjacent to the first portion of said structure to be tested;

encapsulating said structure, said at least one thermal element, and said at least one sensing element in a dielectric material; and heating said first portion of said structure to be tested with said at least one thermal element.

2. The method of claim 1, further comprising the step of connecting said at least one sensing element as a temperature sensor and sensing a temperature of said first portion of said structure to be tested.

3. The method of claim 2, further comprising the steps of:

placing at least a second thermal element adjacent to a second portion of said structure to be tested, wherein said at least a second thermal element is encapsulated with said structure to be tested;

connecting said at least a second thermal element as a heat source;

placing at least a second sensing element adjacent to the second portion of said structure to be tested;

heating said second portion of said structure to be tested with said at least a second thermal element; and sensing a temperature of the second portion of said structure to be tested with said at least a second sensing element.

4. The method of claim 3, further comprising the steps of:

supplying an independent electrical parameter to said structure to be tested; and measuring a dependent electrical parameter of said structure with respect to time.

5. The method of claim 4, further comprising the step of measuring a dynamic characteristic of said structure.

6. The method of claim 5, wherein the structure to be tested is encapsulated in a dielectric material in a semiconductor wafer.

7. The method of claim 1, wherein the step of placing at least one thermal element adjacent to a first portion of said structure to be tested includes the step of juxtaposing said at least one thermal element along essentially an entire length of said structure.

* * * * *